(12) United States Patent | (10) Patent No.: US 12,628,899 B2
Jun | (45) Date of Patent: May 19, 2026

(54) SHOE COMPONENT, CUSHION MEMBER, AND METHOD OF MAKING SAME

(71) Applicant: Cole Haan LLC, Greenland, NH (US)

(72) Inventor: Xiao Jun, Hai Phong City (VN)

(73) Assignee: COLE HAAN LLC, Greenland, NH (US)

( * ) Notice: Subject to any disclaimer, the term of this patent is extended or adjusted under 35 U.S.C. 154(b) by 0 days.

(21) Appl. No.: 19/229,865

(22) Filed: Jun. 5, 2025

(65) Prior Publication Data

US 2026/0101957 A1      Apr. 16, 2026

(51) Int. Cl.
| | |
|---|---|
| *A43B 1/14* | (2006.01) |
| *A43B 13/18* | (2006.01) |
| *C08L 23/0853* | (2025.01) |
| *C08L 53/02* | (2006.01) |
| *C08L 67/00* | (2006.01) |
| *B29D 35/12* | (2010.01) |
| *B29K 21/00* | (2006.01) |

(52) U.S. Cl.
CPC .............. *A43B 1/14* (2013.01); *A43B 13/187* (2013.01); *C08L 23/0853* (2013.01); *C08L 53/02* (2013.01); *C08L 67/00* (2013.01); *B29D 35/122* (2013.01); *B29K 2021/003* (2013.01); *C08L 2205/035* (2013.01); *Y10T 428/26* (2015.01)

(58) Field of Classification Search
CPC ...... A43B 1/14; A43B 13/187; B29D 35/122; B29K 2021/003; Y10T 428/26; C08L 23/0853; C08L 53/02; C08L 67/00; C08L 2205/035
See application file for complete search history.

(56) References Cited

U.S. PATENT DOCUMENTS

| | | | | |
|---|---|---|---|---|
| 4,226,756 | A | * | 10/1980 | Critchfield ............ C08F 283/06 |
| | | | | 526/209 |
| 4,785,127 | A | * | 11/1988 | Cuscurida ................. C08F 2/30 |
| | | | | 558/388 |
| 2017/0215522 | A1 | * | 8/2017 | Tateishi .................. A43B 13/04 |
| 2020/0056018 | A1 | | 2/2020 | Arigo et al. |
| 2023/0397694 | A1 | | 12/2023 | Baghdadi et al. |

FOREIGN PATENT DOCUMENTS

| | | | |
|---|---|---|---|
| CN | 117617626 A | 3/2024 | |
| WO | WO-2004026921 A1 * | 4/2004 | .............. C08F 10/06 |

OTHER PUBLICATIONS

Agnol et al "Thermoplastic polyurethane/butylene-styrene triblock copolymer blends: an alternative to tune wear behavior", Polymber Bulletin, Jun. 3, 2021, vol. 1, No. 19, p. 2 https://doi.org/10.1007/s00289-021-03748-0.

* cited by examiner

*Primary Examiner* — Donald M Flores, Jr.
(74) *Attorney, Agent, or Firm* — Thompson Coburn LLP

(57) ABSTRACT
A shoe component with a composition comprising: thermoplastic polyester elastomer (TPEE), styrene ethylene butylene styrene (SEBS), hydrogenated active resin, metallocene polyethylene, polyol-based styrene block copolymers, and ethylene vinyl acetate (EVA) copolymer.

12 Claims, 2 Drawing Sheets

20

20

222 — FORM FIRST MIXTURE

224 — EXTRUDE FIRST MIXTURE

226 — FORM FIRST GRANULATION

228 — FORM SECOND MIXTURE

230 — FORM SECOND GRANULATION

232 — FORM THIRD MIXTURE

234 — GRANULATE THIRD MIXTURE

226 — MOLD CUSHION MEMBER

SHOE COMPONENT, CUSHION MEMBER, AND METHOD OF MAKING SAME

CROSS-REFERENCE TO RELATED APPLICATIONS

This application claims priority to Chinese Application No. CN 202411432908.X, filed Oct. 14, 2024, the disclosure of which is incorporated by reference herein.

BACKGROUND OF THE INVENTION

Field of the Invention

This invention pertains to a cushion member and method of making the same.

SUMMARY

One aspect of the disclosure is a shoe component with a composition comprising: thermoplastic polyester elastomer (TPEE), styrene ethylene butylene styrene (SEBS), hydrogenated active resin, metallocene polyethylene, polyol-based styrene block copolymers, and ethylene vinyl acetate (EVA) copolymer.

Another aspect of the disclosure is a cushion member with a composition comprising: thermoplastic polyester elastomer (TPEE), styrene ethylene butylene styrene (SEBS), hydrogenated active resin, metallocene polyethylene, polyol-based styrene block copolymers, and ethylene vinyl acetate (EVA) copolymer.

Another aspect of the disclosure is a method of manufacturing a shoe component. Metallocene polyethylene and polyol-based styrene block copolymers are blended to form a first mixture. The first mixture is extruded. The first mixture is granulated to form a first granulation. Thermoplastic polyester elastomer (TPEE), styrene ethylene butylene styrene (SEBS), and hydrogenated active resin are mixed to form a second mixture. The second mixture is granulated to form a second granulation. The first granulation and the second granulation are mixed to form a third mixture. The third mixture is granulated. The third mixture is molded into the shoe component.

Another aspect of the disclosure is a method of manufacturing a cushion member. Metallocene polyethylene and polyol-based styrene block copolymers are blended to form a first mixture. The first mixture is extruded. The first mixture is granulated to form a first granulation. Thermoplastic polyester elastomer (TPEE), styrene ethylene butylene styrene (SEBS), and hydrogenated active resin are mixed to form a second mixture. The second mixture is granulated to form a second granulation. The first granulation and the second granulation are mixed to form a third mixture. The third mixture is granulated. The third mixture is molded into the cushion member.

Further features and advantages, as well as the operation, are described in detail below with reference to the accompanying drawings.

DETAILED DESCRIPTION

Figure 1:
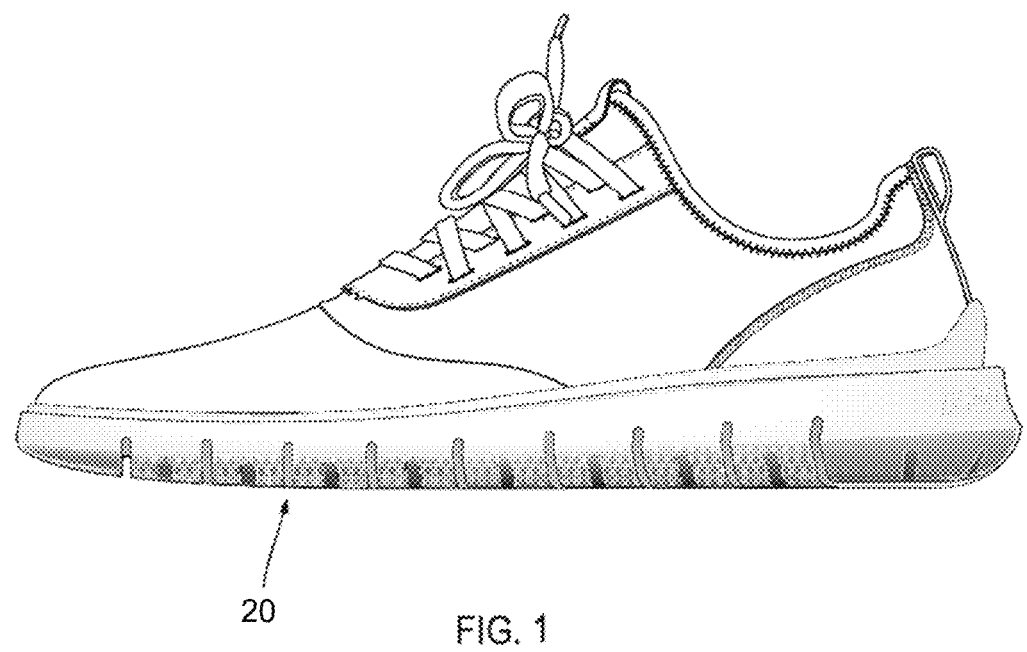
FIG. 1 is a view of a shoe component.

An embodiment of a cushion member in accordance with the present disclosure is indicated generally by reference number 20 in FIG. 1. The cushion member may be a shoe component (e.g., a midsole) or it may be a member unrelated to shoes (e.g., a yoga mat or cushion layer for a handbag shoulder strap). The cushion member 20 has a composition comprising: thermoplastic polyester elastomer (TPEE), styrene ethylene butylene styrene (SEBS), hydrogenated active resin, metallocene polyethylene, polyol-based styrene block copolymers, and ethylene vinyl acetate (EVA) copolymer. The composition may comprise 20±10 parts per hundred parts of resin (PHR) of TPEE, 28±10 PHR of SEBS, 3±2 PHR of hydrogenated active resin, 5±3 PHR of metallocene polyethylene, 17±10 PHR of polyol-based styrene block copolymers, and 27±10 PHR of EVA. Preferably, the composition comprises 20±5 PHR of TPEE, 28±5 PHR of SEBS, 3±1 PHR of hydrogenated active resin, 5±2 PHR of metallocene polyethylene, 17±5 PHR of polyol-based styrene block copolymers, and 27±5 PHR of EVA. More preferably, the composition comprises 20±1 PHR of TPEE, 28±2 PHR of SEBS, 3±1 PHR of hydrogenated active resin, 5±1 PHR of metallocene polyethylene, 17±1 PHR of polyol-based styrene block copolymers, and 27±2 PHR of EVA.

The cushion member 20 may have a hardness of 40±15 Shore C. Preferably, the component has a hardness of 38±3 Shore C. The cushion member 20 may have a specific gravity of 0.19±0.11. Preferably, the cushion member 20 has a specific gravity of 0.15±0.03. The cushion member 20 may have a vertical resilience of 65-75%. The cushion member 20 may have a compression set of less than 30% when compressed for 6 hours at 45 degrees Celsius.

Figure 2:
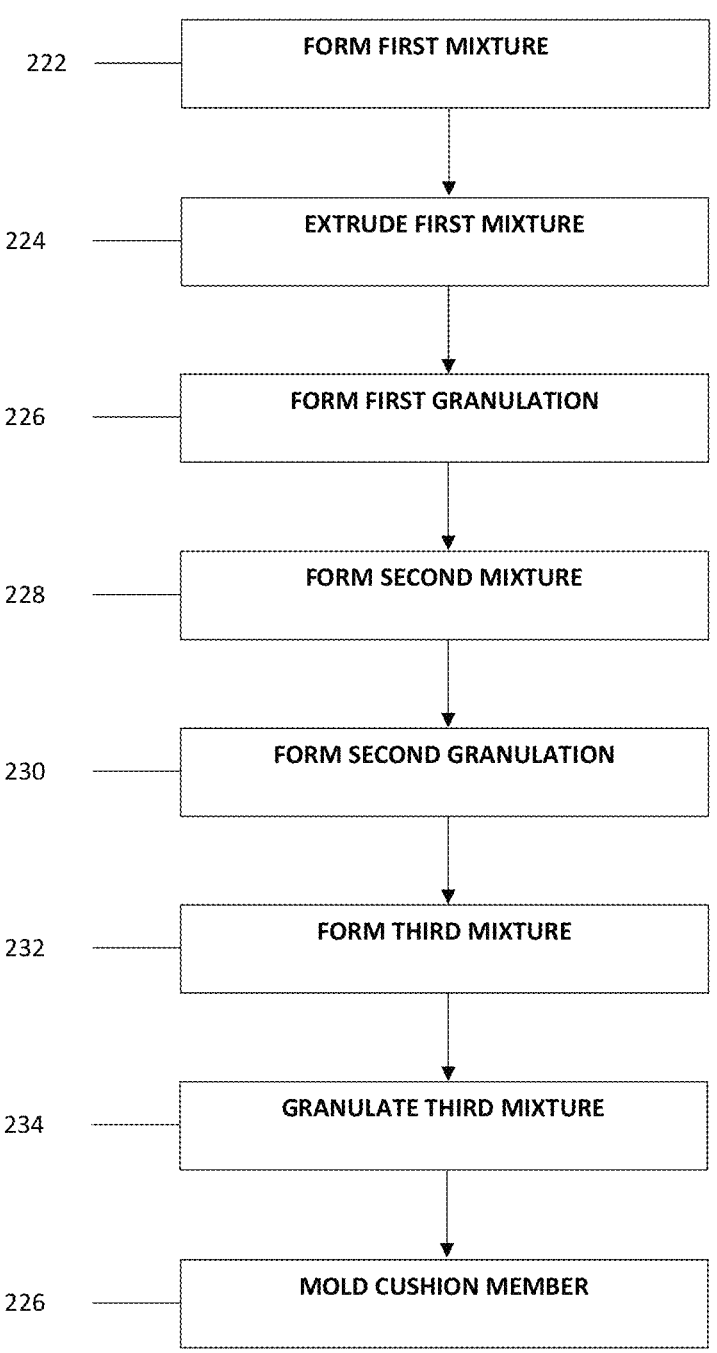
FIG. 2 is a flow diagram for a method of manufacturing a shoe component/cushion member.
Reference numerals in the written specification and in the figures indicate corresponding items.

FIG. 2 is a flow diagram of an embodiment of a method of manufacturing a cushion member 220. The cushion member 220 may be similar in all respects to the cushion member 20 of the embodiment of FIG. 1, except as noted herein.

Referring to reference number 222, the method comprises blending metallocene polyethylene and polyol-based styrene block copolymers to form a first mixture. The blending step 222 may comprise blending the materials until the first mixture reaches 98°±3° C. and flipping the first mixture for a first time, blending the materials until the first mixture reaches 112°±3° C. and flipping the first mixture for a second time, blending the materials until the first mixture reaches 115°±3° C. and flipping the first mixture for a third time, blending the materials until the first mixture reaches 118°±3° C. and flipping the first mixture for a fourth time, and blending the materials until the first mixture reaches 120° C. and flipping the first mixture for a fifth time.

Referring to reference number 224, the method further comprises extruding the first mixture. The first mixture may be extruded at between 180°±5° C. and 200° ±5° C., inclusive. For example, the first mixture may be extruded by an extrusion device having a first, second, third, fourth, and fifth temperature zone, the first, second, third, and fourth temperature zones having a temperature of 200°±5° C., the fifth temperature zone having a temperature of 180°±5° C.

Referring to reference number 226, the method further comprises granulating the first mixture to form a first granulation.

Referring to reference number 228, the method further comprises mixing TPEE, SEBS, and hydrogenated active resin to form a second mixture. It should be understood that the second mixture may be mixed before the first mixture is blended, and vice versa, such that the order in which the first and second mixtures are made is irrelevant. The mixing step 228 may comprise blending the materials until the second mixture reaches 98°±3° C. and flipping the second mixture for a first time, blending the materials until the second mixture reaches 112°±3° C. and flipping the second mixture for a second time, blending the materials until the second mixture reaches 115°±3° C. and flipping the second mixture for a third time, blending the materials until the second mixture reaches 118°±3° C. and flipping the second mixture for a fourth time, and blending the materials until the second mixture reaches 120°±3° C. and flipping the second mixture for a fifth time.

Referring to reference number 230, the method further comprises granulating the second mixture to form a second granulation.

Referring to reference number 232, the method further comprises mixing the first granulation and the second granulation to form a third mixture. The mixing step 232 may comprise blending the materials until the third mixture reaches 98°±3° C. and flipping the third mixture for a first time, blending the materials until the third mixture reaches 112°±3° C. and flipping the third mixture for a second time, blending the materials until the third mixture reaches 115°±3° C. and flipping the third mixture for a third time, blending the materials until the third mixture reaches 118°±3° C. and flipping the third mixture for a fourth time, and blending the materials until the third mixture reaches 120°±3° C. and flipping the third mixture for a fifth time.

Referring to reference number 234, the method further comprises granulating the third mixture.

Referring to reference number 236, the method further comprises molding the third mixture into the cushion member. As used herein, molding includes processes such as injection molding, compression molding, blow molding, extrusion molding, thermoforming, and the like. The molding step 236 may comprise molding the third mixture at a temperature between 172° C. and 178° C., inclusive, vulcanizing the third mixture for between 300 and 800 seconds, inclusive, and cooling the cushion member for between 300 and 800 seconds, inclusive. Additionally, the molding may occur at between 200 and 800 kg/cm$^2$, inclusive.

The cushion member can effectively reduce vibration impact and provide good energy feedback. For example, when used as a shoe component, a user is able to have good support (e.g., arch support) and have significantly reduced impact from walking or exercising. This minimizes potential injury to the user (e.g., stress fractures). The material properties of the cushion members equal or exceed those of supercritical physical foams and—unlike supercritical physical foams—the cushion member can be made via conventional thermoforming processes. As a result, the cushion member requires few production facility inputs and has lower production costs. As a result, the cushion member meets or exceeds the performance of supercritical physical foams while being more economical.

The material was tested in a manner which demonstrates these characteristics. A test piece of the cushion member, having a thickness of 20 millimeters, was placed on a clean (i.e., free from foreign objects), level flat surface, and a raw egg (i.e., not cooked or boiled) was then dropped freely from a height of 8 meters onto the test piece. In 80% of tests, the egg did not break and rebounded to a height of between 4 and 5.6 meters (50-70% of the drop height).

In view of the foregoing, it should be appreciated that the invention has several advantages over the prior art.

It should also be understood that when introducing elements of the present invention in the claims or in the above description of exemplary embodiments of the invention, the terms "comprising," "including," and "having" are intended to be open-ended and mean that there may be additional elements other than the listed elements. Additionally, the term "portion" should be construed as meaning some or all of the item or element that it qualifies. Moreover, use of identifiers such as first, second, and third should not be construed in a manner imposing any relative position or time sequence between limitations.

As various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:

1. A shoe component with a composition comprising: thermoplastic polyester elastomer (TPEE), styrene ethylene butylene styrene (SEBS), hydrogenated resin, metallocene polyethylene, styrene block copolymers, and ethylene vinyl acetate (EVA) copolymer;

wherein the composition comprises 20±10 parts per hundred parts of resin (PHR) of TPEE, 28±10 PHR of SEBS, 3±2 PHR of hydrogenated resin, 5±3 PHR of metallocene polyethylene, 17±10 PHR of styrene block copolymers, and 27±10 PHR of EVA, wherein PHR is based on the total amount of the composition.

2. The shoe component of claim 1 wherein the composition comprises 20±5 PHR of TPEE, 28±5 PHR of SEBS, 3±1 PHR of hydrogenated resin, 5±2 PHR of metallocene polyethylene, 17±5 PHR of styrene block copolymers, and 27±5 PHR of EVA.

3. The shoe component of claim 1 wherein the composition comprises 20±1 PHR of TPEE, 28±2 PHR of SEBS, 3±1 PHR of hydrogenated resin, 5±1 PHR of metallocene polyethylene, 17±1 PHR of styrene block copolymers, and 27±2 PHR of EVA.

4. The shoe component of claim 1 wherein the shoe component has a hardness of 40±15 Shore C.

5. The shoe component of claim 4 wherein the hardness is 38±3 Shore C.

6. The shoe component of claim 1 wherein the shoe component has a specific gravity of 0.19±0.11.

7. The shoe component of claim 6 wherein the specific gravity is 0.15±0.03.

8. The shoe component of claim 1 wherein the shoe component has a vertical resilience of 65-75%.

9. The shoe component of claim 1 wherein the shoe component has a compression set of less than 30%.

10. The shoe component of claim 1 wherein the shoe component has a hardness of 40±15 Shore C, a specific gravity of 0.19±0.11, a vertical resilience of 65-75%, and a compression set of less than 30%.

11. The shoe component of claim 1 wherein the styrene block copolymers are polyol-based styrene block copolymers.

12. A cushion member with a composition comprising: thermoplastic polyester elastomer (TPEE), styrene ethylene butylene styrene (SEBS), hydrogenated resin, metallocene polyethylene, styrene block copolymers, and ethylene vinyl acetate (EVA) copolymer;

wherein the composition comprises 20±10 parts per hundred parts of resin (PHR) of TPEE, 28±10 PHR of SEBS, 3±2 PHR of hydrogenated resin, 5±3 PHR of metallocene polyethylene, 17±10 PHR of styrene block copolymers, and 27±10 PHR of EVA, wherein PHR is based on the total amount of the composition.

\* \* \* \* \*